United States Patent Office 3,314,910
Patented Apr. 18, 1967

3,314,910
COPOLYMERS OF CYCLOBUTENE-1,2-DICYANIDE AND A CONJUGATED DIOLEFIN
Dorothy C. Prem and June T. Duke, Maple Heights, and Janice L. Greene, Warrensville Heights, Ohio, assignors to The Standard Oil Company, Cleveland, Ohio, a corporation of Ohio
No Drawing. Filed Apr. 16, 1964, Ser. No. 360,445
12 Claims. (Cl. 260—29.7)

This invention relates to copolymers of cyclobutene-1,2-dicyanide and one or more copolymerizable alkenyl monomers and to the process for preparing said copolymers.

Cyclobutene-1,2-dicyanide and a method for preparing it are more fully disclosed and claimed in the copending U.S. patent application of Janice L. Greene, Norman W. Standish and Nancy R. Gray, Ser. No. 312,313, filed Sept. 30, 1963, now Patent No. 3,275,676. This monomer is believed to have the structure

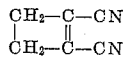

We have discovered that cyclobutene-1,2-dicyanide will copolymerize with at least one conjugated diolefin having from 4 to 9 carbon atoms to produce useful polymeric products. The copolymers of this invention are useful as rubbers and also in the preparation of molded articles, films, adhesives, and the like. The conjugated diolefins useful in the present invention are those containing from about 4 to 9 carbon atoms including the well-known diene hydrocarbons such as butadiene-1,3, isoprene, piperylene, 2,3-dimethyl butadiene-1,3, 2-ethyl-butadiene-1,3, hexadiene-1,3, 4-methyl-1,3-pentadiene, and the like and the halogenated dienes, such as chloroprene, bromoprene and fluoroprene.

Other monomers which can be employed in minor proportions in the present interpolymerization process with cyclobutene-1,2-dicyanide and the conjugated diolefin include one or more of the following monoalkenyl monomers: the vinyl halides, such as vinyl chloride, vinyl bromide, vinyl fluoride, vinylidene chloride, dichlorodifluoroethylene, chlorotrifluoroethylene, and the like; vinyl esters, such as vinyl acetate, vinyl propionate, vinyl butyrate, vinyl chloroacetate, vinyl chloropropionate, vinyl benzoate, vinyl chlorobenzoate, vinyl laurate, and others; the acrylic and alpha-alkyl acrylic acids, their esters, their amides and their nitriles, such as acrylic acid, chloroacrylic acids, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, N-t-butyl acrylamide, N-methylol acrylamide, N-octyl acrylamide; acrylonitrile, alpha-chloroacrylonitrile, methacrylamide, N-methyl methacrylamide, N-methylol methacrylamide, N-octyl methacrylamide, methacrylonitrile, ethacrylonitrile, and others; vinyl aromatic compounds, such as styrene, alpha-methyl styrene, dichlorostyrene, vinyl toluene, the vinyl xylenes, vinyl naphthalene, and others; esters of maleic and fumaric acids, such as dimethyl maleate, diethyl maleate, diethyl fumarate, dibutyl fumarate, maleic anhydride, maleic acid, fumaric acid, itaconic acid, and others; vinyl ethers and ketones such as vinyl methyl ether, vinyl ethyl ether, vinyl butyl ether, 2-chloroethyl vinyl ether, vinyl benzyl ether, vinyl phenyl ether, methyl vinyl ketone, ethyl vinyl ketone, isoamyl vinyl ketone, phenyl vinyl ketone, benzyl vinyl ketone, isobutyl vinyl ketone, methyl isopropenyl ketone, cyclohexyl vinyl ketone and others; monoolefins, such as ethylene, propylene, isobutylene, the amylenes, the hexylenes, cyclohexenes, and others; other monomers, such as the vinyl pyridines, N-vinyl carbazole, N-vinyl pyrrolidone, ethyl methylene malonate, allyl acetate, allyl propionate, methallyl acetate and various other readily polymerizable compounds containing an olefinic double bond and especially those containing the

group.

In addition to the foregoing monomers, there also may be employed in the preparation of the interpolymer of cyclobutene-1,2-dicyanide and conjugated diolefin embodied herein one or more monomeric materials having a plurality of polymerizable

groupings wherein the said groupings are separated from one another by at least one intervening atom, and such materials include allyl esters such as diallyl phthalate, diallyl isophthalate, diallyl terphthalate, diallyl adipate, diallyl succinate, triallyl citrate, diallyl maleate, diallyl itaconate, diallyl oxalate, diallyl glutarate, diallyl fumarate, dimethallyl phthalate, allyl acrylate, allyl methacrylate, methallyl acrylate, methallyl methacrylate, polyallyl ethers of polyhydric alcohols, such as diallyl ethylene glycol, trimethallyl glycerol, tetraallyl pentaerythritol, polyallyl sorbitol, polyallyl inositol, polyallyl raffinose, and others; vinyl esters such as divinyl fumarate, vinyl acrylate, vinyl methacrylate, isopropenyl acrylate, and others; vinyl ethers of polyhydric alcohols including divinyl ethylene glycol the divinyl ether of cyclohexane diol, trivinyl glycerol, tetravinyl pentaerythritol, polyvinyl ethers of sucrose, polyvinyl ethers of glucose, polyvinyl ethers of starch, and others; acrylic esters of polyhydric alcohols, such as ethylene glycol diacrylate, ethylene glycol dimethacrylate, glycerol triacrylate, inositol hexaacrylate, pentaerythritol tetramethacrylate, polyacrylate esters of sucrose, glucose raffinose, mannitol and the like; triallyl cyanurate, triacrylyl hexahydrotriazine, trimethacrylyl hexahydrotriazine, hexaallyl trimethylene trisulfone, diallyl melamine, methylene-bis-acrylamide, methylene-bis-methacrylamide, N,N-diallyl acrylamide, N-allyl acrylamide, N,N-diallyl methacrylamide, N-methallyl methacrylamide, triallyl phosphate, diallyl benzene phosphonate, diallyl propene-1-phosphonate, tetraallyl silane, tetraallyl tin, tetravinyl germane, diallyl divinyl silane, triallyl vinyl tin, 1,5-hexadiene, 1,7-octadiene, 1,8-nonadiene, divinyl benzene, trivinyl benzene, diisopropenyl benzene, tetraallyl methane, tetramethallyl methane, tetravinyl methane, and others.

The interpolymers of this invention can be prepared in bulk, solvent, emulsion or suspension types of polymerization procedures. It is preferred that the copolymerization process be carried out in the substantial absence of molecular oxygen, preferably in the presence of an inert gas such as nitrogen, helium, carbon dioxide, and the like.

The copolymerization process preferably utilizes a free-radical initiator such as the peroxygen compounds including acetyl peroxide, benzoyl peroxide, hydrogen peroxide, caprylyl peroxide, t-butyl hydroperoxide, dicumyl peroxide, and the like; the azo initiators, such as azobisisobutyronitrile and the like. The copolymerization may also be initiated by heat or other radiant energy such as ultra-violet light, X-rays, nuclear radiation, and the like.

The preferred polymers embodied in this invention are those composed of units derived from the polymerization of a mixture of (1) from about 10 to 70% by weight of cyclobutene-1,2-dicyanide, (2) from about 30 to 90% by weight of a conjugated diolefin and (3) from about 0 to 60% by weight of at least one other vinyl monomer which is copolymerizable with (1) and (2). More preferred are polymers of the foregoing type wherein the (3) component is a monovinyl monomer. In the above-described proportions of the various monomers, it is to be understood that when a maximum amount of one monomer is employed in the polymerization mixture that the relative proportions of the remaining monomers must be adjusted so that the combined weight percentage of monomers used in any single polymerization will total substantially 100%.

The polymers embodied in this invention are prepared in the preferred manner in an aqueous medium in the presence of a suitable polymerization catalyst in the range of from about 20 to 60% total solids. The aqueous medium may be emulsifier free or it may contain an emulsifier. Suitable emulsifiers include organic sulfates and sulfonates such as sodium lauryl sulfate, the alkali metal salts of sulfonated petroleum or paraffin oils, the sodium salts of aromatic sulfonic acids such as the sodium salt of naphthalene sulfonic acids, the sodium salts of dodecane-1-sulfonic acid, octadecane-1-sulfonic acid, etc.; the polyalkyl and polyalkaryl alkoxylene phosphonate acids and salts more fully described in U.S. Patent No. 2,853,471, and the like; aralkyl sulfonates such as sodium isopropyl benzene sulfonate, sodium dodecyl benzene sulfonate and sodium isobutyl naphthalene sulfonate; alkali metal salts of sulfonated dicarboxylic acid esters and amides such as sodium dioctyl sulfosuccinate, sodium N-octadecyl sulfosuccinamate and the like, and others. The so-called cationic emulsifiers such as the salts of strong inorganic acids and organic bases containing long carbon chains; for example, lauryl amine hydrochloride, the hydrochloride of diethylaminoethyl decylamine, trimethyl cetyl ammonium bromide, dodecyl trimethyl ammonium bromide, the diethyl cyclohexylamine salt of cetyl sulfuric esters and others may be used. In addition to the above and other polar or ionic emulsifiers, still other materials which may be used, singly or in combination with one or more of the above types of emulsifiers include the so-called "non-ionic" emulsifiers such as the polyether alcohols prepared by condensing ethylene or propylene oxide with higher alcohols, the fatty alkylol amine condensates, the diglycol esters of lauric, oleic and stearic acids, and others. It is often desirable to add post-polymerization emulsifiers to the latices embodied herein for improved stability.

Particularly preferred as polymerization initiators are the water-soluble peroxygen compounds such as hydrogen peroxide and the sodium, potassium and ammonium persulfates, the water-soluble oxidation-reduction or "redox" types of catalysts, and the heavy metal activated, water-soluble peroxygen and redox catalysts. The preferred range of catalyst is from about 0.01 to about 3 parts by weight per one-hundred parts by weight of the monomer component.

It may also be desirable to incorporate from about 0.1 to 5% by weight of an antioxidant or a mixture of antioxidants such as the hindered phenols and diaryl amines into the latex or into the coagulated polymers embodied herein.

Although the polymerization may be carried out in the presence of oxygen or air, the rate of reaction is ordinarily faster in the absence of oxygen and hence, polymerization in an evacuated vessel, at reflux, or under an inert atmosphere such as nitrogen is preferred. The temperature at which the polymerization is carried out is not critical, it may be varied widely from $-30°$ C. to $100°$ C. or higher, though best results are generally obtained at a temperature of from about $0°$ C. to about $70°$ C.

Other polymerization techniques and practices conventionally employed in the preparation of butadiene synthetic rubbers may also be used in the polymerization of the monomer mixtures herein described. For example, the use of mercaptan modifiers in the reaction mixture is often desirable and results in lower raw polymer viscosity and other allied plastic properties.

In the following examples which will illustrate the process and some specific compositions embodied in this invention, the amount of ingredients used are expressed in parts by weight unless otherwise indicated.

EXAMPLE I

A copolymer of cyclobutene-1,2-dicyanide was prepared in a polymerization reactor in the substantial absence of oxygen at a temperature of $60°$ C. for a reaction period of six hours employing the following recipe:

| | Parts |
|---|---|
| Cyclobutene-1,2-dicyanide | 66.0 |
| Butadiene-1,3 | 34.0 |
| Potassium persulfate | 0.26 |
| n-Dodecyl mercaptan | 0.50 |
| Daxad–11* | 0.10 |
| Sodium lauryl sulfate | 2.50 |
| Water | 180.0 |

* A polymerized sodium salt of alkaryl and aralkyl sulfonic acids obtained from Dewey and Almy Chemical Company.

Coagulation of the latex product by conventional means produced a rubbery polymer. A conversion of 73.9% was obtained as determined by total solids analysis. Infrared analysis of the rubbery polymeric product indicated the presence of units in the polymer derived from both butadiene and the cyclobutene-1,2-dicyanide. A film cast from the original latex was found to have a tensile strength of 886 p.s.i., a tensile modulus of $3.60 \times 10^4$ p.s.i., an elongation of 164% and a Sward Hardness of 10.

EXAMPLE II

The procedure of Example I was repeated with the exception that 1.0 part of n-dodecyl mercaptan, 25.0 parts of cyclobutene-1,2-dicyanide and 75.0 parts of butadiene-1,3 were used. At the completion of the polymerization reaction a conversion of 87% was found and the coagulated polymer was rubbery.

The rubbery polymer was mixed with the following ingredients on a rubber mill:

| | Parts |
|---|---|
| Polymer | 100 |
| Zinc oxide | 3 |
| Benzothiazyl disulfide | 1.5 |
| Stearic acid | 1.0 |
| Sulfur | 1.5 |
| Bis(2-hydroxy-3-t-butyl-5-ethyl phenyl)methane | 1.5 |
| Tetramethyl thiuram disulfide | 0.15 |
| HAF carbon black | 30.0 |

The polymer handled nicely on the mill. The compounded rubber was cured at $300°$ F. for 30 minutes and the cured stock was found to have the following properties:

| | |
|---|---|
| Tensile at break, p.s.i. | 1610 |
| Elongation at break, percent | 190 |
| 100% modulus, p.s.i. | 1105 |

EXAMPLE III

A polymerization reaction similar to that described in Example I was carried out at $60°$ C. for two and three-quarters hours using the following recipe:

| | |
|---|---|
| Cyclobutene-1,2-dicyanide | 10.0 |
| Acrylonitrile | 40.0 |
| Butyl vinyl ether | 20.0 |
| Butadiene | 30.0 |
| Potassium persulfate | 0.50 |
| n-Dodecyl mercaptan | 0.04 |
| Daxad–11 | 0.10 |
| GAFAC RE 610* | 2.35 |
| Water | 180 |

* Which is a mixture of $R\!-\!O\!-\!(CH_2CH_2O\!-\!)_nPO_3M_2$ and $[R\!-\!O\!-\!(CH_2CH_2O\!-\!)_n]_2PO_2M$ wherein $n$ is a number of from 1 to 40, R is an alkyl or alkaryl group and preferably a nonyl phenyl group and M is hydrogen, ammonia or an alkali metal which composition is sold by the General Aniline and Film Corp.

The pH of the mixture was 7.0 and M was potassium. A conversion of monomers to polymer of 88.5% was achieved. Physical test data showed that a film cast from the above latex had tensile of $1.69 \times 10^3$ p.s.i., elongation of 414%, tensile modulus of $4.68 \times 10^3$ p.s.i. and Sward hardness of 8.

EXAMPLE IV

A series of polymers designated A–D below were prepared employing a procedure similar to that described in Example I from the following recipes:

|  | A | B | C | D |
|---|---|---|---|---|
| Butadiene-1,3 | 75.0 |  |  | 75.0 |
| Isoprene |  | 75.0 |  |  |
| 2,3-dimethyl butadiene-1,3 |  |  | 75.0 |  |
| Cyclobutene-1,2-dicyanide | 15.0 | 25.0 | 25.0 | 25.0 |
| Acrylonitrile | 10.0 |  |  |  |
| Potassium persulfate | 0.26 | 0.26 | 0.26 | 0.26 |
| n-Dodecyl mercaptan | 0.50 | 0.50 | 0.50 | 1.0 |
| Daxad-11 | 0.10 | 0.10 | 0.10 | 0.10 |
| Sodium lauryl sulfate | 2.50 | 2.50 | 2.50 | 2.50 |
| Water | 180.0 | 180.0 | 180.0 | 180.0 |

The pH of each polymerization mixture was about 9.

In each case interpolymers formed which were rubbery in nature and could be handled nicely on a rubber mill. Conversions were in the order of 80 to 100%.

EXAMPLE V

A copolymer was prepared by the procedure of Example I except that 34 parts of cyclobutene-1,2-dicyanide and 66 parts of butadiene were employed in the polymerization recipe. The polymerization reaction was carried out at 60° C. for seven and one-half hours. A conversion of 100% was obtained. The coagulated polymer was tough and rubbery and was found by analysis to contain 8.61% nitrogen which is an indication that at least 32% of the cyclobutene-1,2-dicyanide is present in polymeric form.

EXAMPLE VI

A copolymer was prepared in the absence of solvent or diluent and in the substantial absence of molecular oxygen by reacting at 60° C. for thirty hours the following mixture:

Cyclobutene-1,2-dicyanide _____ 50.00
Butadiene-1,3 _____ 50.00
Azobisisobutyronitrile _____ 0.50

A very tough and rubbery polymer resulted. The polymer was found to be insoluble in benzene, acetone, dimethyl formamide and dimethyl sulfoxide.

EXAMPLE VII

By a procedure similar to that given in Example VI, a copolymer was prepared from the following ingredients:

Cyclobutene-1,2-dicyanide _____ 34.0
Butadiene-1,3 _____ 66.0
n-Dodecyl mercaptan _____ 0.50
Azobisisobutyronitrile _____ 0.50

A polymerization time of about twenty-four hours at 60° C. was used. The polymer was a tough, rubbery material and infrared analysis indicated that the polymer contained both butadiene-1,3 and cyclobutene-1,2-dicyanide in polymerized form.

We claim:
1. The polymer derived from the polymerization of a mixture of
   (1) from about 10 to 70% by weight of cyclobutene-1,2-dicyanide,
   (2) from about 30 to 90% by weight of at least one conjugated diolefin, and
   (3) from about 0 to 60% by weight of at least one other vinyl monomer which is copolymerizable with (1) and (2).
2. The interpolymer composed of units derived from the polymerization of a mixture of
   (1) from about 10 to 70% by weight of cyclobutene-1,2-dicyanide,
   (2) from about 30 to 90% by weight of at least one conjugated diolefin having from 4 to 9 carbon atoms, and
   (3) from about 0 to 60% by weight of at least one other monovinyl monomer which is copolymerizable with (1) and (2).
3. The interpolymer of claim 2 wherein the conjugated diolefin is butadiene-1,3.
4. The interpolymer of claim 2 wherein the conjugated diene is isoprene.
5. The interpolymer of claim 2 wherein the conjugated diolefin is 2,3-dimethyl butadiene-1,3.
6. The interpolymer of claim 3 wherein the component (3) is acrylonitrile.
7. The process comprising polymerizing a mixture of
   (1) from about 10 to 70% by weight of cyclobutene-1,2-dicyanide,
   (2) from about 30 to 90% by weight of at least one conjugated diolefin, and
   (3) from about 0 to 60% by weight of at least one other vinyl monomer which is copolymerizable with (1) and (2) in the substantial absence of oxygen in the presence of a free radical catalyst at a temperature of from −30° C. to 100° C.
8. The process of claim 7 carried out in an aqueous emulsion in the presence of an emulsifier.
9. The process of claim 8 carried out at a temperature of from about 0° C. to about 70° C.
10. The process of claim 9 wherein from about 0.01 to about 3 parts by weight per one-hundred parts by weight of the monomer content of free radical catalyst is employed.
11. The polymer latex resulting from the process of claim 8.
12. The polymer latex resulting from the process of claim 10.

References Cited by the Examiner
UNITED STATES PATENTS
3,275,676   9/1966   Greene et al. _____ 260—464

MURRAY TILLMAN, *Primary Examiner.*
J. T. GOOLKASIAN, *Assistant Examiner.*